April 7, 1953
F. NETTEL
2,633,698
TURBOSUPERCHARGER MEANS TO HEAT INTAKE OF
COMPRESSION-IGNITION ENGINE FOR STARTING
Filed Feb. 5, 1948
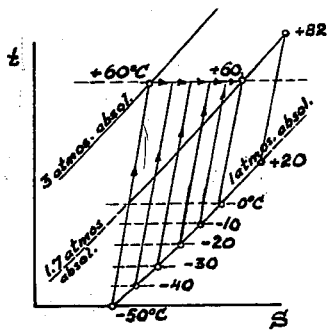
Fig.1.
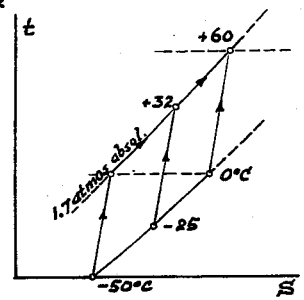
Fig.2.
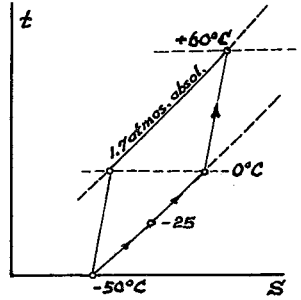
Fig.3.
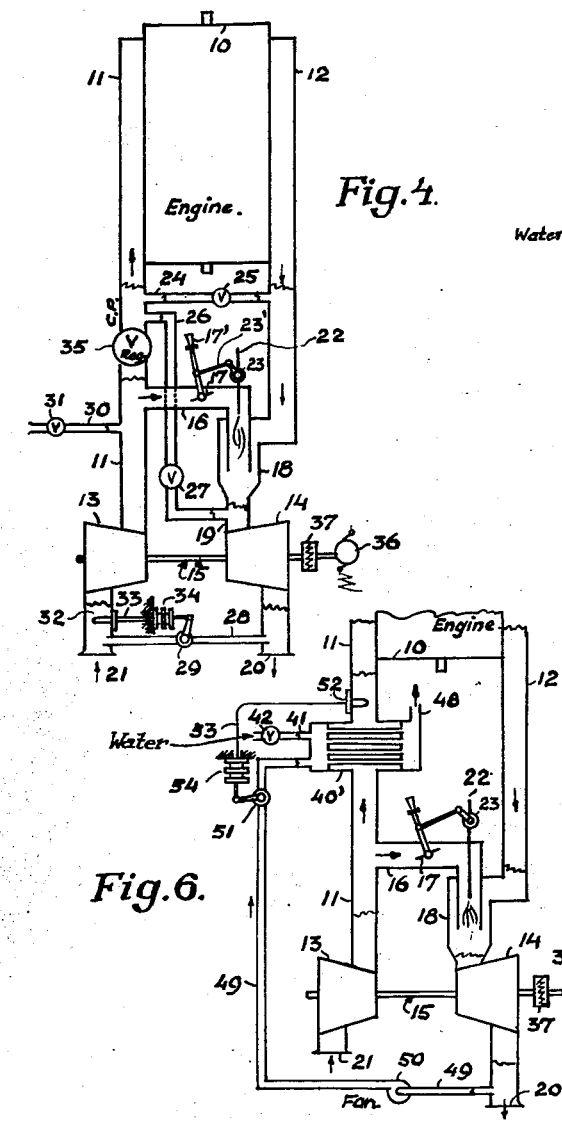
Fig.4.
Fig.6.
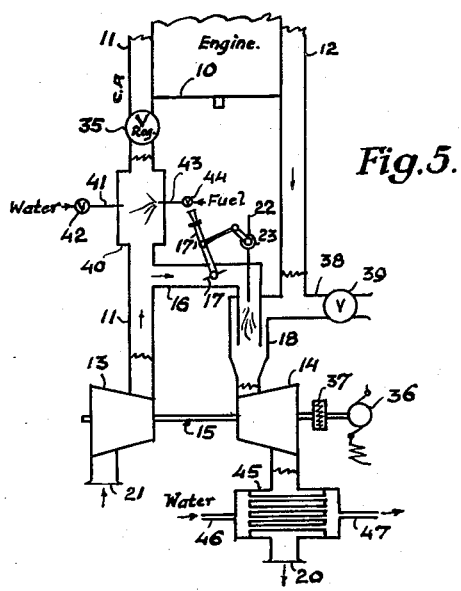
Fig.5.
Inventor:
Frederick Nettel.
By
Bertram Ottinger Patented Apr. 7, 1953

2,633,698

UNITED STATES PATENT OFFICE 2,633,698

TURBOSUPERCHARGER MEANS TO HEAT INTAKE OF COMPRESSION-IGNITION ENGINE FOR STARTING

Frederick Nettel, Manhasset, N. Y.

Application February 5, 1948, Serial No. 6,445

5 Claims. (Cl. 60—13)

This invention relates to low temperature starting and operation of internal combustion engines.

It long has been known that internal combustion engines, and particularly compression-ignition engines, are difficult to start at low ambient temperatures, and that supercharging such engines increases the difficulty of starting.

Various proposals heretofore have been made to overcome this difficulty. Thus, engine intake air has been preheated by burning fuel therein, by the use of electricity and by other means. Again, in an engine having an exhaust gas-turbine driven supercharging blower, the turbine has been driven, before starting the engine, by a compressed air bottle or some other auxiliary source of power, a limited quantity of air was heated by circulating it through a bypass between the intake and delivery sides of the blower, and this heated air was supplied to the engine air intake for starting.

The foregoing, and other known equipment, have been unsuccessful because of various complications such as ice formation in the turbines, the size of the air bottles, the consumption of oxygen in the engine intake air, etc. Moreover, preheating has been operable only during starting, but not during running, where very low ambient temperatures were encountered, as in the Arctic Zones. Under conditions of this nature it has been possible to start the engines by various preheating means, but, as soon as these were cut out, the end temperature of compression of the cold intake air was below that required to ignite the fuel, so that the engine stopped.

It also has been proposed to throttle the air during starting at the intake valve of a naturally aspirating engine. This helps starting somewhat, but is of no use at very low ambient air temperatures.

It is the principal object of this invention to overcome these difficulties with a novel means for starting and running engines of the character described, said means being effective and efficient at extremely low ambient temperatures, such, for instance, as minus 50° C.

It is another object of the invention to apply the new means to both naturally aspirating and supercharged engines of either the two- or four-stroke cycle types.

These objects of the invention are achieved by pre-compressing the combustion air prior to and during starting of the engine, preferably in a rotary compressor, to a pressure higher than that ordinarily required for starting the engine at normal ambient temperatures whereby to heat said air through compression, and to throttle the air thus heated to the pressure required for the engine before guiding it to the cylinders.

Pursuant to the invention, engines having scavenging or supercharging blowers employ these blowers to produce the requisite higher pressure.

In engines using scavenging or supercharging blowers driven by exhaust gas turbines, according to this invention means are provided to produce additional power in these turbines to produce the desired degree of air compression independent of the working condition of the engine, including standstill.

This invention further provides means to adjust or regulate the degree of compression in the blower in predetermined relationship to the temperature of the ambient air, preferably in such a manner that the pressure ratio in the blower increases with decreasing ambient air temperature.

Other objects of this invention relate to the control devices for the blowers and turbines adapted to satisfy the requirements of the engine under all conditions of operation thereof.

Still other objects and advantages of the invention will be apparent from the following description and illustration of the invention.

In the accompanying drawing, in which are shown various possible embodiments of the invention, Figs. 1–3 are temperature-entropy diagrams illustrating varying conditions of engine intake air treated in accordance with different embodiments of the invention;

Fig. 4 is a schematic view of an engine constructed in accordance with the invention; and Figs. 5 and 6 are views similar to Fig. 1 of engines embodying modified forms of the invention.

Referring now in detail to the diagrams,

Fig. 1 is a temperature-entropy diagram for air, showing the conditions under which a compression-ignition engine has to start and operate with low ambient air temperatures, and the steps taken, according to this invention, to ensure satisfactory performance. In the example shown, a supercharged engine designed for supercharging to 1.7 atmos. absol. may start satisfactorily down to an intake temperature to the blower of 0° C. Under this condition, the exhaust gas turbine driven blower furnishes, with a blower efficiency of about 70%, compressed air of about +60° C. (compression line 0 ... +60). If now the ambient air temperature drops to say −30° C., the blower operating at the same pressure ratio of 1.7 would furnish air of only about 26° C. at which the engine, considering that it is generally designed with increased clearance space as compared with a naturally aspirating engine, would start badly or not at all (compression line −30 ... +26).

In order to maintain good starting performance, it may be desirable to maintain +60°, or a temperature near to that, in the engine intake manifold, even at the lowest air temperature considered possible, say −50° C. Under this condition, according to the present invention, the supercharging blower is operated, in a manner later described, at a pressure ratio of about 3:1 (compression line −50 ... +60) from which it is evident that the blower now again yields +60° C. as an exit temperature. However, the pressure is too high for the intake manifold, and therefore this phase of the invention prescribes throttling of the air, which takes place at constant enthalpy or temperature, to the prescribed pressure of 1.7 atmos. absol. This throttling is represented in the diagram by a horizontal line, starting at the endpoint of the compression line −50 ... +60 and ending at the intersection with the pressure-constant curve for 1.7 atmos. absol.

We see that we arrive at exactly the same state of air in the intake manifold, as that which prevailed when the engine worked with 0° C. intake air.

For ambient air temperatures between −50 and 0° C. the compression lines −40 ... +60, −30 ... +60, −20 ... +60 indicate that, with increasing ambient temperatures, the pressure ratios in the supercharging blower, and the degree of throttling after compression may drop. At 0° C. intake air and above throttling can be dispensed with.

In Fig. 1 the compression lines are shown with the same inclination to the vertical for all pressure ratios in the blower. This indicates that, for simplicity's sake, the blower efficiency has been assumed constant. Actually, if the blower is designed for best efficiency at a pressure ratio of 1.7, its efficiency will drop materially with increasing pressure ratio. Accordingly, the inclination of the compression lines to the vertical will increase in a commercial blower, with decreasing ambient air temperatures. The losses in the blower increase so that, for example, to achieve a temperature rise from −50 to +60° C. a smaller pressure ratio than 3:1 actually will suffice.

The new method of starting, with the supercharger blower acting simultaneously as an air heater, solves the starting problem in a simple and inexpensive manner. However, as indicated, heating during starting only does not always solve the operation troubles, especially at low engine loads, and, therefore, this invention optionally provides continuous operation of the supercharger blower with pressure ratios higher than those necessary for operation at normal ambient air temperatures, and after-throttling as explained above, the degree of air compression and throttling being varied in a predetermined manner with the ambient air temperature and for the engine load.

In highly supercharged engines with exhaust gas turbine driven blowers, means must be provided for starting the turbocharger set as a power self-supporting gas turbine plant, with the engine at standstill as yet, so that suitably heated compressed air is available when the engine is cranked for starting.

This is done by providing an engine by-pass from the blower delivery side to the turbine inlet in which an auxiliary combustion chamber is interposed. By rotating this set and burning fuel in said chamber, the supercharger set can work independently of the engine with pressure ratios adjustable at will within a wide range.

The economy and operability of this starting and operating method according to this invention is due to the fact that the compression work per kg. of air decreases with the absolute temperature at blower intake. Thus, prior to cranking the engine for starting, power equilibrium in the turbocharger set running by itself with intake air of, for example, −50° C., is obtainable even at the highest mentioned pressure ratio of 3:1 in the blower with a turbine inlet temperature of only about 450° C. (turbine efficiency is assumed to be about 72% and pressure drop in the cycle at 0.3 atmos.).

Conditions for air preheating are different under operation, when the engine might operate with a supercharge ratio of say 1.8 to 1. Due to the throttling before the engine, the expansion ratio in the turbine is also reduced to say 1.7 to 1, so that for power equilibrium in the turbocharger set the temperature in front of the turbine would have to rise to more than 800° C. max. even though for a short time, until the engine has warmed up somewhat. While this is possible, it is not very desirable, and therefore this invention provides alternative means described later as this specification proceeds.

The conditions for continued air preheating in the turbocharger become progressively easier with rising ambient air temberatures, and at −30° C. the pressure ratio in the blower drops to about 2.4 with a temperature in front of the turbine of about 670° C. If this temperature is available in the exhaust from the engine, which is however the case at very high loads only, heating in the auxiliary combustion chamber may not be necessary.

At −10° C. a pressure ratio in the blower of 1.9 suffices; and for power balance at 1.7:1 supercharge in the engine, only about 550° C. will do in front of the turbine. If the exhaust gas temperature should become substantially higher, it may in this case even be necessary to blow off some exhaust gas to the atmosphere, to prevent an unnecessarily high pressure ratio in the blower.

During operation of the engine at low loads and/or speeds, which state generally exists immediately following starting of the engine, the exhaust temperature is low, and may drop considerably below 400° C. While supercharging in this case is not of importance, air preheating may continue to be important. Therefore, at partial loads and/or speeds the invention may require continued operation of the turbocharger set at pressure ratios in excess of what would be necessary from the point of view of power yield of the engine, with after-throttling, the power equilibrium in the turbocharger set being maintained, if necessary, by burning fuel in the auxiliary combustion chamber.

Working of the turbocharger set under normal conditions of 1.7:1, with intake air of say +20° C., is indicated in Fig. 1 by the compression line +20 ... +82. In this case good starting and operating conditions may be maintained with lower pressure ratios of the blower, say 1.4, in which case again +60° C. obtains in the engine intake manifold. It will depend on the load and/or speed condition and design of the engine, whether or not fuel has to be burned in the auxiliary combustion chamber.

It is within the scope of this invention to combine air heating by compression, with heating of the air directly or indirectly from a heat source. Such heating may be effected for example by mixing of hot gases with the combustion air, or by surface heat transfer from such gases, or by electric heaters, or, finally, by burning fuel in the intake air. This combination offers great practical advantages in that it avoids high pressure ratios in the turbocharger, and too high temperatures at the turbine inlet, thus resulting in cheaper design of the turbocharger set. It also is more economical in fuel consumption and for continuous heating of the intake air at partial load operation of the engine.

It also is within the scope of this invention to use exhaust gas heat from the engine or the turbine to heat the engine air, either at the intake to the supercharger blower, or at the delivery side of said blower.

Fig. 2 shows a temperature-entropy diagram illustrating the state of the air in case of compression followed by isobaric heating, in an engine designed for a normal supercharge ratio of 1.7:1. With intake air of —50° C. and the turbocharger set working at full speed, the air will leave the blower at about —0° C. The heating from this temperature to 60° C. takes place isobarically substantially along the constant pressure line 1.7 atmos. absol., the whole process being represented in the diagram by the line —50 ... —15 ... +60. With air intake at —25° C. the process takes place along line —25 ... +32 ... +60; and with 0° C. intake air, along line 0 ... +60. Specific means for executing the heating will be described subsequently.

Fig. 3 shows another temperature-entropy diagram illustrating the state of the air in case of heating of the engine intake air followed by compression, for an engine such as mentioned with respect to Fig. 2. The intake air at, for example, —50° C. is first heated substantially isobarically along the constant pressure line 1.0 atmos. absol. to 0° C., and thereafter compressed to 1.7 atmos. absol., being thereby heated to +60° C. The whole process thus is represented by line —50 ... 0 ... +60. For —25° C. intake air, the process is correspondingly represented in the diagram by line —25 ... 0 ... +60. At intake air 0° C., no preheating is necessary since the compression alone raises the temperature from 0 to +60° C. The specific means for achieving the requisite heating will be described hereinafter.

It is known that highly supercharged engines employ after-coolers for the air issuing from the blowers. According to the present invention, this after-cooler, which may be of the surface or/and contact type (injection of coolant into the air stream), is made inoperative when the ambient air temperature drops below a predetermined value.

It is within the scope of this invention to use the very device, which during operation at normal ambient air temperatures serves as an after-cooler, as a heater for the compressed air during operation at low ambient air temperatures.

Referring now to Fig. 4, the reference numeral 10 denotes a combustion engine of the compression-ignition or spark-ignition type with which any of the methods described with reference to Figs. 1–3 may be practiced. Said engine includes an air intake pipe 11 and an exhaust pipe 12. A turbocharger set is provided comprising a blower 13 for scavenging or supercharging, and an exhaust gas driven turbine 14 coupled to the blower by a shaft 15. The blower discharges into the air intake pipe. However, a varying amount of the blower output can be diverted into a by-pass conduit 16 depending upon the position of a hand lever 17' which governs the setting of a control valve 17 in said by-pass conduit. Said conduit leads fresh air from the blower to an auxiliary combustion chamber 18 whose output is fed through a pipe 19 to the gas turbine inlet. The combustion chamber also receives engine exhaust gases from the pipe 12 and directs the same to the turbine. Spent gases from the turbine are discharged at an outlet 20 and fresh air is taken into the system at the blower inlet 21.

Fuel for the auxiliary combustion chamber is supplied through a feed pipe 22 controlled by a valve 23 having an operating lever connected by a link 23' to the hand lever 17' so that both the fuel and fresh air supplied to the auxiliary combustion chamber can be jointly controlled.

Several other by-passes are provided. The first of these is a conduit 24 between the blower outlet and the exhaust pipe, said conduit having a control valve 25. The second by-pass is another conduit 26 extending from the blower outlet to the pipe 19 and also controlled by a valve 27. A third conduit 28 connects the blower inlet 21 to the turbine outlet 20. An additional conduit 30 controlled by a valve 31 branches off from the blower outlet and leads to a space of lower pressure.

The valve 29 is automatically operated by a vapor pressure type thermometer 32 disposed in the blower inlet and connected by a tube 33 to an elastic bellows 34 linked to said valve. A constant pressure outlet valve 35 is located in the engine air intake pipe. Said valve 35 is regulatable (optionally by hand) to maintain any selected outlet pressure. For starting the turbocharger set there is employed an electric starting motor 36 coupled to the set, as by an overrunning clutch 37.

Prior to cranking the engine, the turbocharger set is started by rotating the set through the starting motor 36 with valves 17, 25, 27, 29, 31 and 35 closed. Thereafter, valve 17 is gradually opened by operating hand lever 17', which also serves to gradually open the fuel valve 23. The fuel is ignited in the air stream set up from the air inlet 21, through the blower 13, pipe 11, conduit 16, combustion chamber 18, pipe 19, turbine 14 and out through outlet 20. The hot gases formed in the chamber 18 begin to drive the turbine 14 which takes over the drive of the turbocharger set, thereby causing the coupling 37 to automatically disengage the motor 36. Said motor 36 then can be switched off.

If the engine is to be started at a very low ambient air temperature, say —50° C., according to the method described with respect to Fig. 1, enough fuel is burned in the chamber 18 to raise the speed of the turbocharger set to a point at which the pressure delivered by the blower 13 is 3 atmos. absol. Valve 35 now is put into operation, throttling this pressure down to 1.7 atmos. absol. and admitting this air, which according to Fig. 1 has a temperature of about +60°

C., to the engine. Now the engine is cranked in the usual manner (by conventional means not shown) and it will start satisfactorily.

If the engine is required to start according to the method described with respect to Fig. 2, the procedure is modified in that the turbocharger set is made to run at a speed which will deliver air of 1.7 atmos. absol. only. Valve 35 in this case is opened completely, and valve 25 is opened somewhat to allow hot exhaust gases to flow from pipe 12 to pipe 11, mixing therein with the air, so that the mixture again reaches a temperature of about +60° C. before it reaches the engine cylinders. Flow from pipe 12 to pipe 11 may not be steady; but large pressure waves are created in pipe 12 at starting. The peaks of these waves are higher than the steady pressure in pipe 11. Thus, sufficient hot gases will flow from pipe 12 to pipe 11 to heat the air in pipe 11 while the engine is starting. This mode of operation is possible at starting and at low loads, because under these conditions the pressure in pipe 12 is generally somewhat higher than the pressure in pipe 11.

Instead of using conduit 24 for mixing hot gases with the compressed and heated fresh air, it is also possible to use conduit 26 and valve 27, in which case hotter gases issuing from the combustion chamber are thus mixed. In this case it is possible to attain the same temperature rise of the air with a smaller quantity of gases, which may be advantageous.

The method of starting the engine according to the method described with respect to Fig. 3 is realized by operating the turbocharger set at a pressure ratio of 1.7:1 (in the example shown), but opening valve 29 to an extent dependent on ambient air temperature. Since the pressure in outlet 20 is always somewhat higher than that in inlet 21, hot exhaust gases will flow into inlet 21, mixing with the intake air before both enter the blower 13. In the drawing, the valve 29 is shown automatically operated from the vapor pressure type thermometer 32 and bellows 33 in such a manner that the mixture temperature before the blower is kept substantially constant, irrespective of the ambient air temperature.

In the remaining figures, parts denoting the same elements are described by the same reference numerals as those used in Fig. 4.

Fig. 5 shows basically the same arrangement of the engine and turbocharger set, except that in air intake 11 there is a chamber 40 interposed just in front of the pressure regulating valve 35. Into this chamber, water can be sprayed through a pipe 41 via a valve 42. There also is provision for admitting fuel to said chamber through a pipe 43 and a valve 44. From the engine exhaust 12 a branch pipe 38, with a valve 39, leads to the atmosphere. In addition, a water heater 45 is arranged in the turbine outlet 20, said heater including a water inlet tube 46 and a water outlet 47.

At normal ambient air temperatures, water is injected into the chamber 40 through pipe 41 where it evaporates in the warm compressed air, thereby cooling it. The effect of chamber 40 is that of an after-cooler, as known per se for supercharged engines.

At low ambient air temperatures the air issuing from the blower may be too cold. In this case, fuel is injected into the chamber 40 and ignited, thus heating the air to the extent necessary for satisfactory operation of the engine.

The valve 35 is operated as a throttle valve, only if over-compression is used for operation at very low ambient air temperatures. Valve 39 (waste gate) is opened to blow off some of the engine exhaust if the turbocharger set, even with the combustion in chamber 18 out of operation, should furnish a too high pressure. The water heater 20 can be used to preheat the engine cooling water before cranking, and optionally the lubrication oil or the fuel tank as well.

Fig. 6 illustrates a modification of the arrangement shown in Fig. 5. Here a surface type heat exchanger 40' is interposed in air intake 11. At normal ambient air temperatures heat exchanger 40' is used as an after-cooler by admitting water through pipe 41 and valve 42, the water leaving through a pipe 48. At low ambient air temperatures hot exhaust gases are branched off from the turbine outlet 20 through conduit 49, having a forced draft fan 50, and are blown via a valve 51 through the heat exchanger, now acting as an air heater, and out through the pipe 48. Valve 51 may be automatically operated from a vapor-pressure type thermostat 52 in the pipe 11 past the heat exchanger, said thermostat operating through a tube 53 and bellows 54, so as to keep the temperature of the air in the intake pipe 11 constant at varying ambient air temperatures.

It will thus be seen that I have provided apparatuses which achieve the several objects of this invention and are well adapted to meet the conditions of practical use.

At various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a reciprocating internal combustion engine, air charging compressor means driven by exhaust gas turbine means arranged mechanically independent of the engine shaft, means to rotate said compressor and gas turbine means, means connecting the compressor delivery side with the engine intake manifold, means connecting the turbine inlet with the engine exhaust manifold, means connecting the compressor delivery side with the turbine inlet, means to burn fuel in said last-named means so as to operate the compressor and gas turbine means as a power self-supporting gas turbine plant the compressor delivery of which is at a pressure exceeding that permissible for operation of the engine and thereby preheat air for the engine by compression to a predetermined temperature required for starting the engine, a constant pressure outlet throttle valve for throttling the air after compression whereby to reduce the pressure of the heated air to that required in the engine intake manifold, and means to crank said engine.

2. In combination, a main source of power constituting a reciprocating compression-ignition internal combustion engine, air charging compressor means driven by exhaust gas turbine means arranged mechanically independent of the engine shaft, means to rotate said compressor and gas turbine means, means connecting the compressor delivery side with the engine intake manifold, means connecting the turbine inlet with the engine exhaust manifold, means connecting the compressor delivery side with the turbine inlet, means to burn fuel in said last-named means so as to operate the compressor and gas turbine means as an auxiliary power self-supporting gas turbine plant and thereby preheat air for the main engine by compression during starting and running of said engine, valve-controlled conduit means connecting the turbine outlet to the compressor inlet for heating the compressor intake air prior to heating said air by compression, and means to crank said engine.

3. In combination, a reciprocating internal combustion engine, air charging compressor means driven by exhaust gas turbine means arranged mechanically independent of the engine shaft, means to rotate said compressor and gas turbine means, means connecting the compressor delivery side with the engine intake manifold, means connecting the turbine inlet with the engine exhaust manifold, means connecting the compressor delivery side with the turbine inlet, means to burn fuel in said last-named means so as to operate the compressor and gas turbine means as a power self-supporting gas turbine plant and thereby preheat air for the engine by compression, means to throttle the air after compression whereby to reduce the pressure of the heated air to that required in the engine intake manifold, valve-controlled means connecting the turbine inlet to the low pressure side of the throttling means for heating the compressor delivery air after said air has been heated by compression, and means to crank said engine.

4. In combination, a reciprocating internal combustion engine, air charging compressor means driven by exhaust gas turbine means arranged mechanically independent of the engine shaft, means to rotate said compressor and gas turbine means, means connecting the compressor delivery side with the engine intake manifold, means connecting the turbine inlet with the engine exhaust manifold, means connecting the compressor delivery side with the turbine inlet, means to burn fuel in said last-named means so as to operate the compressor and gas turbine means as a power self-supporting gas turbine plant the compressor delivery of which is at a pressure exceeding that permissible for operation of the engine and thereby preheat air for the engine by compression to a predetermined temperature required for starting the engine, a constant pressure outlet throttle valve for throttling the air after compression whereby to reduce the pressure of the heated air to that required in the engine intake manifold, valve-controlled means connecting the engine exhaust to the low pressure side of the throttling means, and means to crank said engine.

5. In combination, a main source of power constituting a reciprocating compression-ignition internal combustion engine, air charging compressor means driven by exhaust gas turbine means arranged mechanically independent of the engine shaft, means to rotate said compressor and gas turbine means, means connecting the compressor delivery side with the engine intake manifold, means connecting the turbine inlet with the engine exhaust manifold, means connecting the compressor delivery side with the turbine inlet, means to burn fuel in said last-named means so as to operate the compressor and gas turbine means as an auxiliary power self-supporting gas turbine plant and thereby preheat air for the main engine by compression during starting and running of said engine, conduit means connecting the turbine outlet to the compressor inlet for heating the compressor intake air prior to heating said air by compression, a valve in said conduit means, means responsive to the temperature of the air entering the compressor for controlling said valve, and means to crank said engine.

FREDERICK NETTEL.

REFERENCES CITED

The following references are of record in the file of this patent:

UNITED STATES PATENTS

| Number | Name | Date |
|---|---|---|
| 1,789,362 | Good | Jan. 20, 1931 |
| 1,821,662 | Muller | Sept. 1, 1931 |
| 2,092,246 | Firth | Sept. 7, 1937 |
| 2,227,666 | Noack | Jan. 7, 1941 |
| 2,283,694 | Perrine | May 19, 1942 |
| 2,354,179 | Blanc | July 25, 1944 |
| 2,368,642 | Crago | Feb. 6, 1945 |
| 2,372,272 | Helmore | Mar. 27, 1945 |
| 2,379,455 | Prince | July 3, 1945 |
| 2,404,275 | Clark et al. | July 16, 1946 |
| 2,411,227 | Planiol | Nov. 19, 1946 |
| 2,414,296 | Gill | Jan. 14, 1947 |
| 2,443,717 | Birmann | June 22, 1948 |
| 2,464,047 | Larkin | Mar. 8, 1949 |
| 2,465,099 | Johnson | Mar. 22, 1949 |
| 2,474,068 | Sammons et al. | June 21, 1949 |

FOREIGN PATENTS

| Number | Country | Date |
|---|---|---|
| 12,735 | Great Britain | May 31, 1906 |
| 537,483 | Great Britain | June 24, 1941 |
| 696,369 | France | Oct. 14, 1930 |